United States Patent [19]
Yam et al.

[11] Patent Number: 6,007,241
[45] Date of Patent: Dec. 28, 1999

[54] APPARATUS AND METHOD FOR MEASURING SUBSTRATE TEMPERATURE

[75] Inventors: Mark Yam, San Jose; Aaron M. Hunter, Santa Cruz, both of Calif.

[73] Assignee: Applied Materials, Inc., Santa Clara, Calif.

[21] Appl. No.: 09/026,855

[22] Filed: Feb. 20, 1998

[51] Int. Cl.⁶ .................... G01J 5/06; G01J 5/08
[52] U.S. Cl. ............ 374/131; 374/130; 219/405
[58] Field of Search .................... 374/130, 131; 219/405

[56] References Cited

U.S. PATENT DOCUMENTS

| | | | |
|---|---|---|---|
| 3,796,099 | 3/1974 | Shimotsuma et al. | 374/126 |
| 4,408,878 | 10/1983 | Fischbach | 356/43 |
| 4,611,930 | 9/1986 | Stein | 374/126 |
| 4,659,234 | 4/1987 | Brouwer et al. | 374/121 |
| 4,708,474 | 11/1987 | Suarez-Gonzalez | 356/45 |
| 4,881,823 | 11/1989 | Tanaka et al. | 374/126 |
| 4,919,542 | 4/1990 | Nulman et al. | 374/9 |
| 4,956,538 | 9/1990 | Moslehi | 219/121.6 |
| 4,979,134 | 12/1990 | Arima et al. | 702/135 |
| 5,011,295 | 4/1991 | Krishnan et al. | 374/126 |
| 5,029,117 | 7/1991 | Patton | 702/135 |
| 5,156,461 | 10/1992 | Moslehi et al. | 374/126 |
| 5,226,732 | 7/1993 | Nakos et al. | 374/133 |
| 5,326,171 | 7/1994 | Thompson et al. | 374/121 |

FOREIGN PATENT DOCUMENTS

| | | |
|---|---|---|
| 0 612 862 A1 | 8/1994 | European Pat. Off. . |
| 0718610A1 | 6/1996 | European Pat. Off. . |

OTHER PUBLICATIONS

Doering, "Microelectronics Manufacturing Science and Technology Program Extends Capabilities in Integrated–Circuit Manufacturing," Microelectronics Manufacturing Science & Technology, 2–64, Sep. 1992.

Apte et al., "Rapid Thermal Processing Uniformity Using Multivariable Control of a Circularly Symmetric 3 Zone Lamp," IEEE Transactions on Semiconductor Manufacturing, vol. 5, No. 3, 180–188, Aug. 1992.

Roozeboom, "Manufacturing Equipment Issues in Rapid Thermal Processing," Rapid Thermal Processing Science and Technology, 349–423, 1993. (No Month).

Pikashov et al., "Determining Emissivity and True Surface Temperature by Means of a Pyrometer and an Attachment," Gas Institute Kiev, Inzhenerno–Fizicheskii Zhurnal, 16, 500–506, Apr. 1969.

Roozeboom, "Rapid Thermal Processing: Status, Problems and Options after the first 25 years," Mat.Res.Soc. Symp-.Proc. 303, 149–164, 1993. (No Month).

Gyurcsik et al., "A Model for Rapid Thermal Processing: Achieving Uniformity Through Lamp Control," IEEE Transactions on Semiconductor Manufacturing, 4, 9–13, Feb. 1991.

Sorrell et al., "Temperature Uniformity in RTP Furances," IEEE Transactions on Electron Devices 39, 75–80, Jan. 1992.

(List continued on next page.)

*Primary Examiner*—Randy W. Gibson
*Assistant Examiner*—Stanley J. Pruchnic, Jr.
*Attorney, Agent, or Firm*—Fish & Richardson

[57] ABSTRACT

An apparatus for measuring the temperature of a substrate in a thermal processing chamber. The substrate is suspended above a reflector to form a reflecting cavity. A probe of a temperature sensor has an input end positioned to receive radiation from the reflecting cavity and an output end optically coupled to a detector to provide a temperature reading. The temperature sensor is configured to reduce the effect that radiation which has an axis of propagation within an angle of an axis normal to the reflector, e.g., substantially normal radiation from a portion of the substrate adjacent to the input end of the probe, has on the temperature reading.

37 Claims, 8 Drawing Sheets

OTHER PUBLICATIONS

Honda et al., "New Radiation Thermometry Using Multiple Reflection for Temperature Measurement on Steel Sheets," American Institute of Physics, 923–927. (No Date).

A. Gouffe, Revue D'Optique 24, 1–10, 1945 (22 pages translation). (No Month).

Dilhac et al., "Temperature Control in a Rapid Thermal Processor," IEEE Transactions on Electron Devices 39, 201–203, Jan. 1992.

Hernandez et al., "Determining emissivity at high temperatures using fiber–optic systems equipped with reflector hemispheres," J.Phys. III France, 1575–1586, May 1991 (12 pages translation).

Deardorff, "Elimination of reflection errors in emissometers by using alternate apertures," Rev.Sci. Instrum., vol.47, No.10, 1279–1282, Oct. 1976.

S.Norman, "Optimization of Transient Temperature Uniformity in RTP Systems," IEEE, 205–207, Jan. 1992.

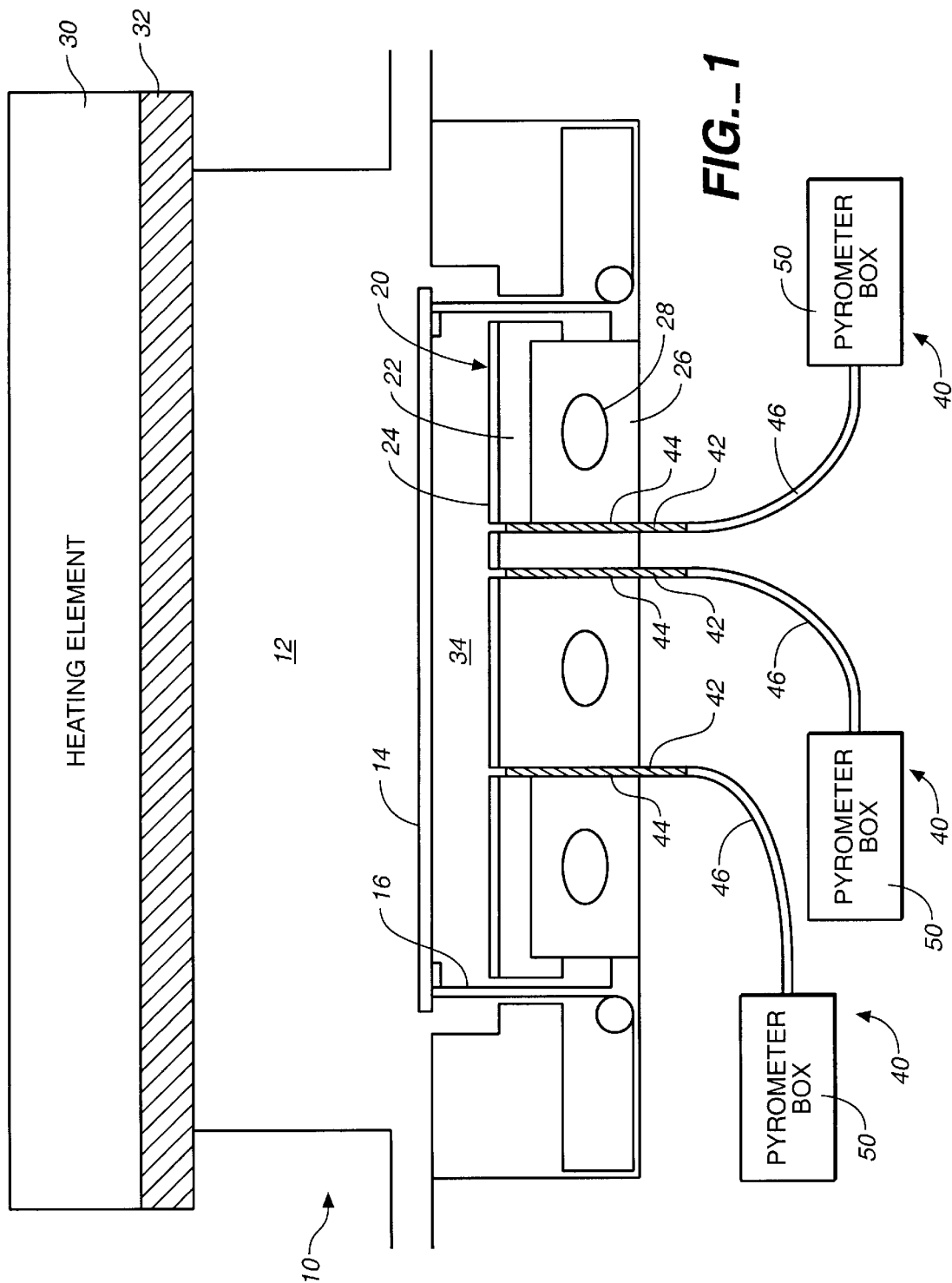
FIG._1

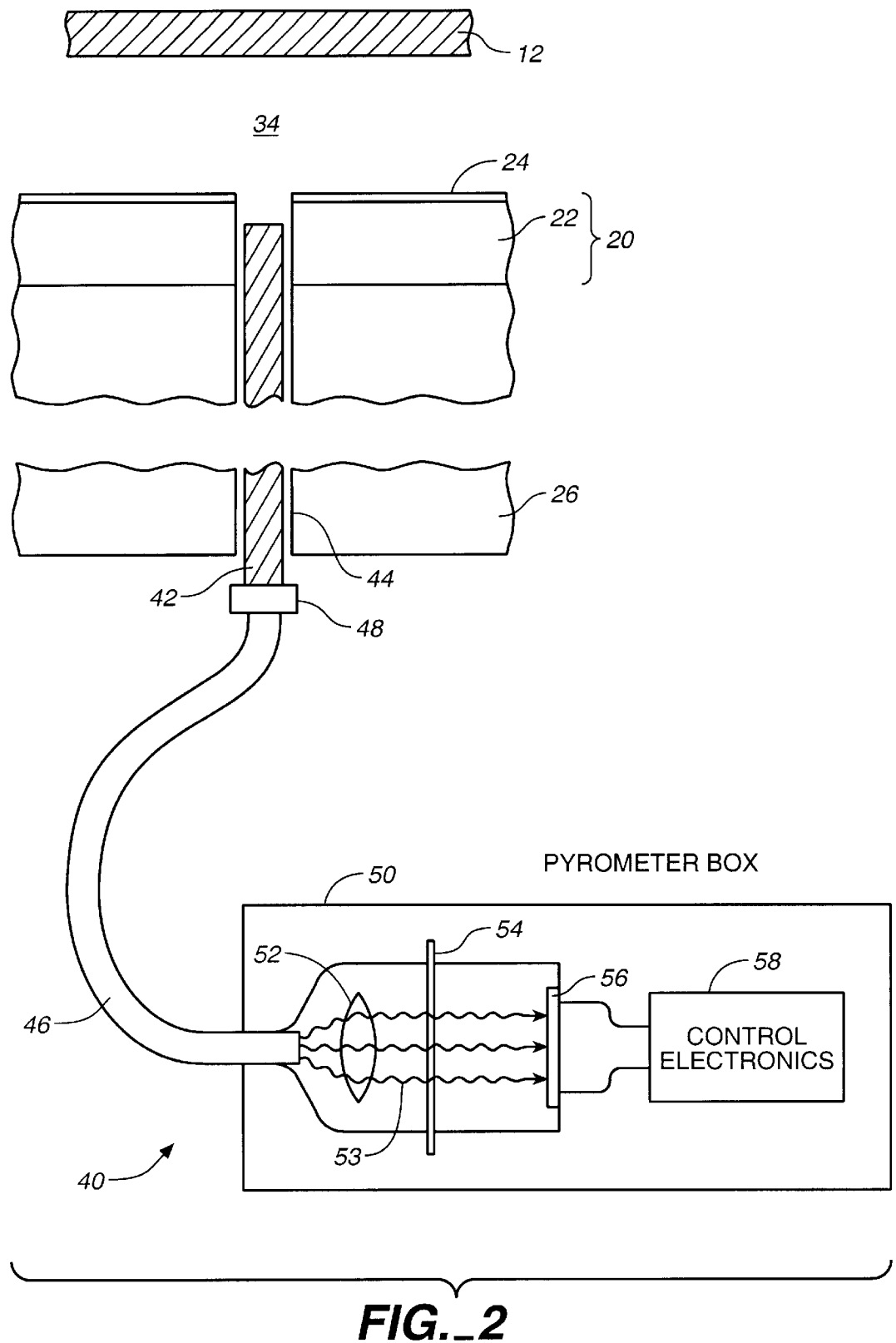
FIG._2

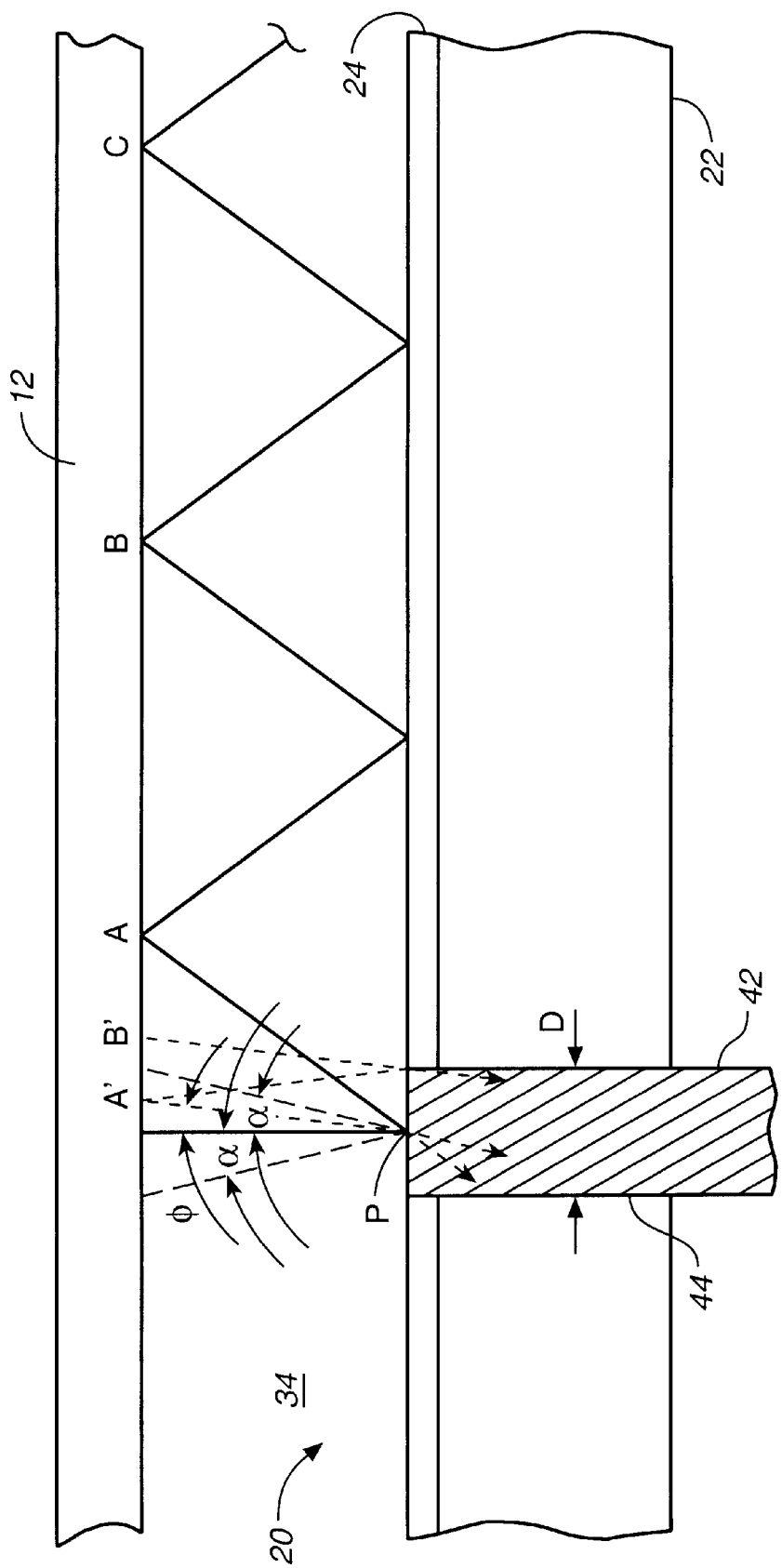
FIG._3

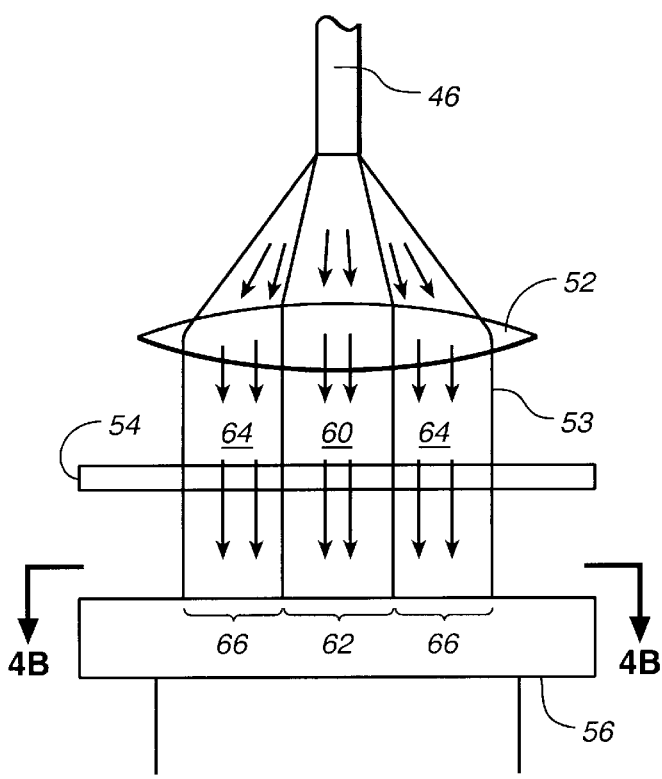
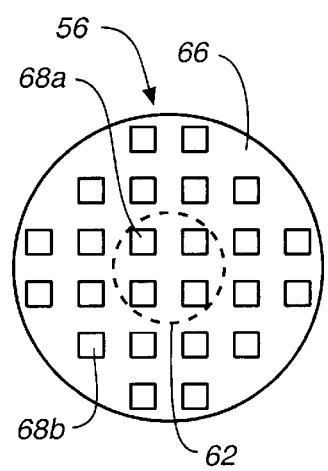
FIG._4A          FIG._4B

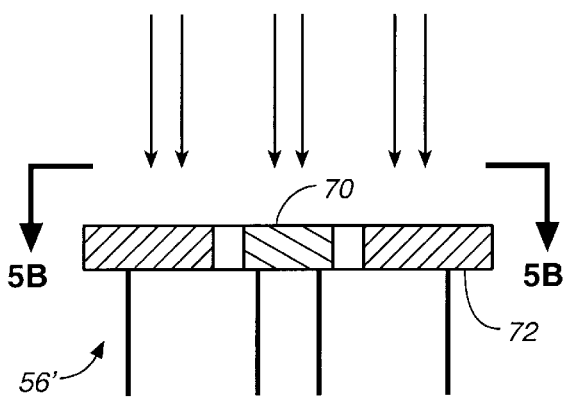
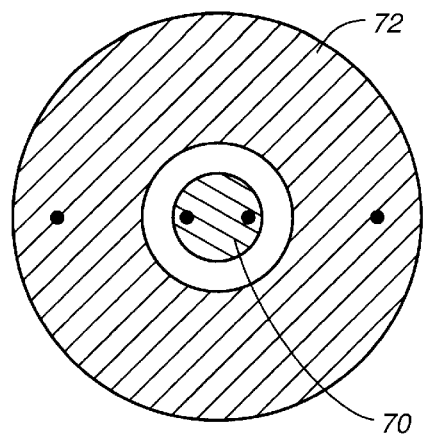
FIG._5A    FIG._5B
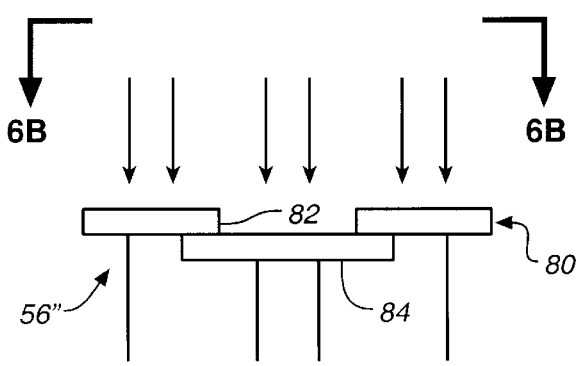
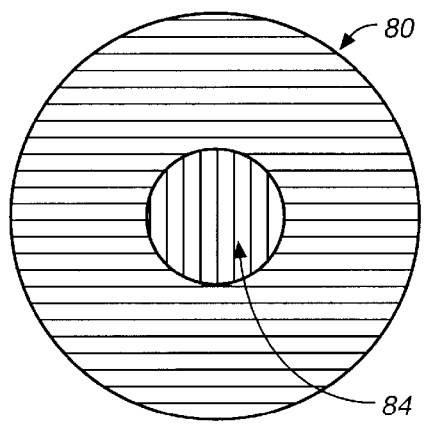
FIG._6A    FIG._6B

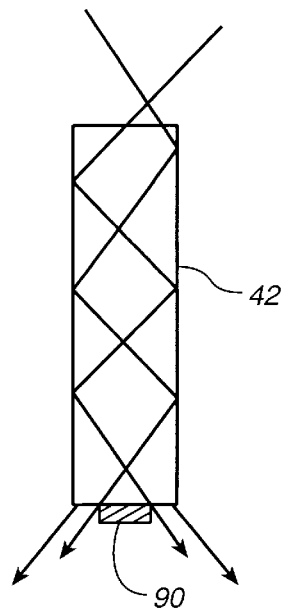
FIG._7A
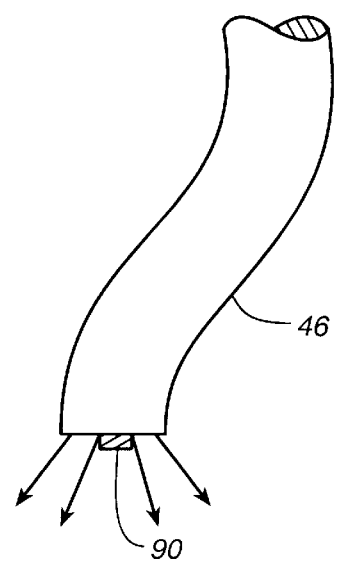
FIG._7B
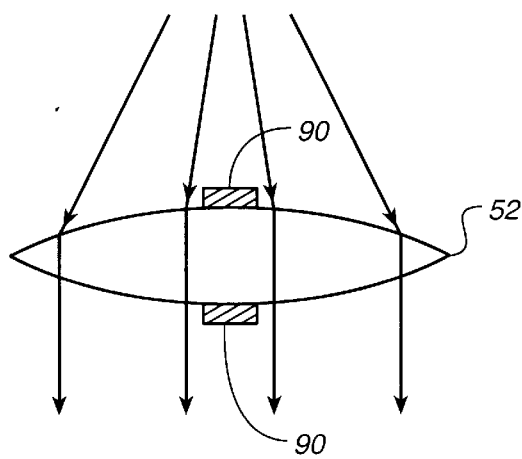
FIG._7C
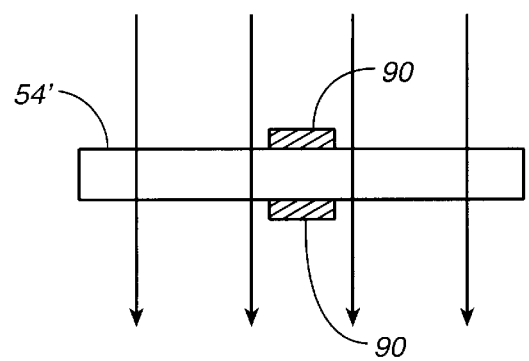
FIG._7D
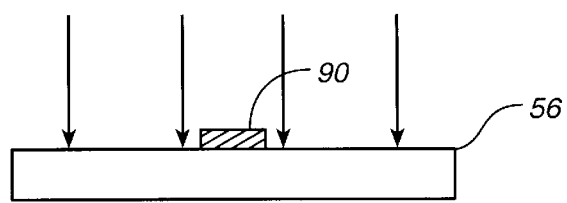
FIG._7E

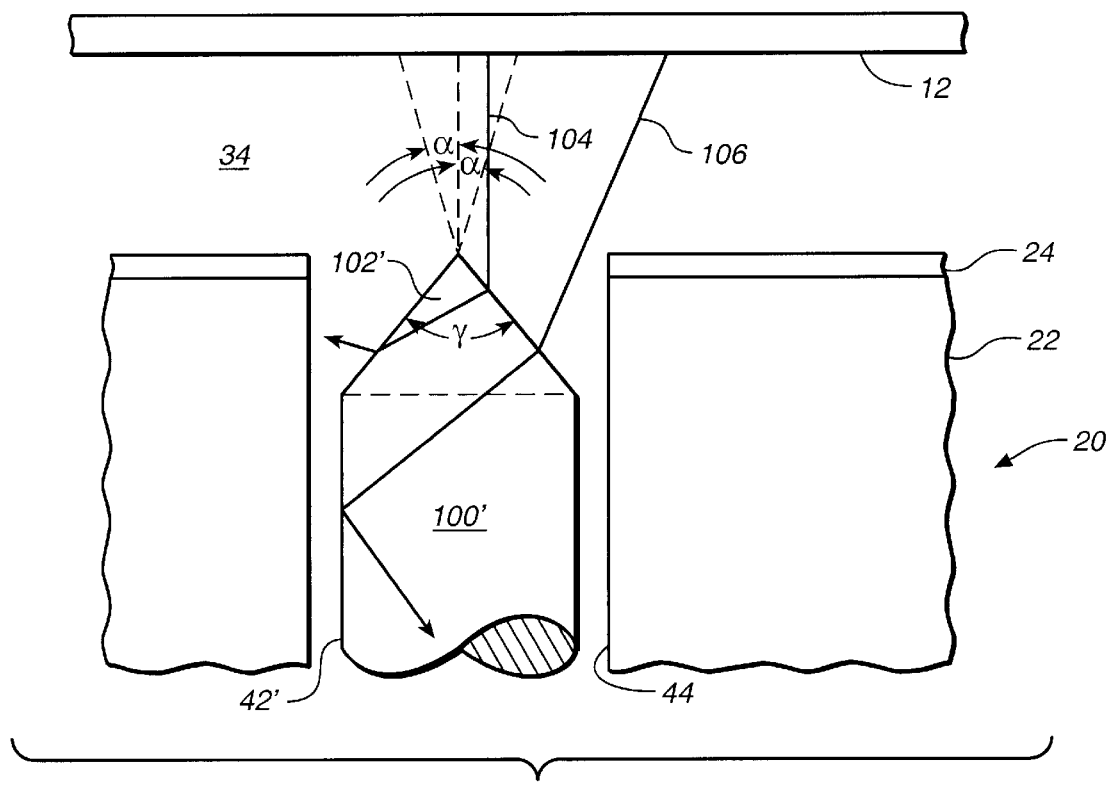
FIG._8A
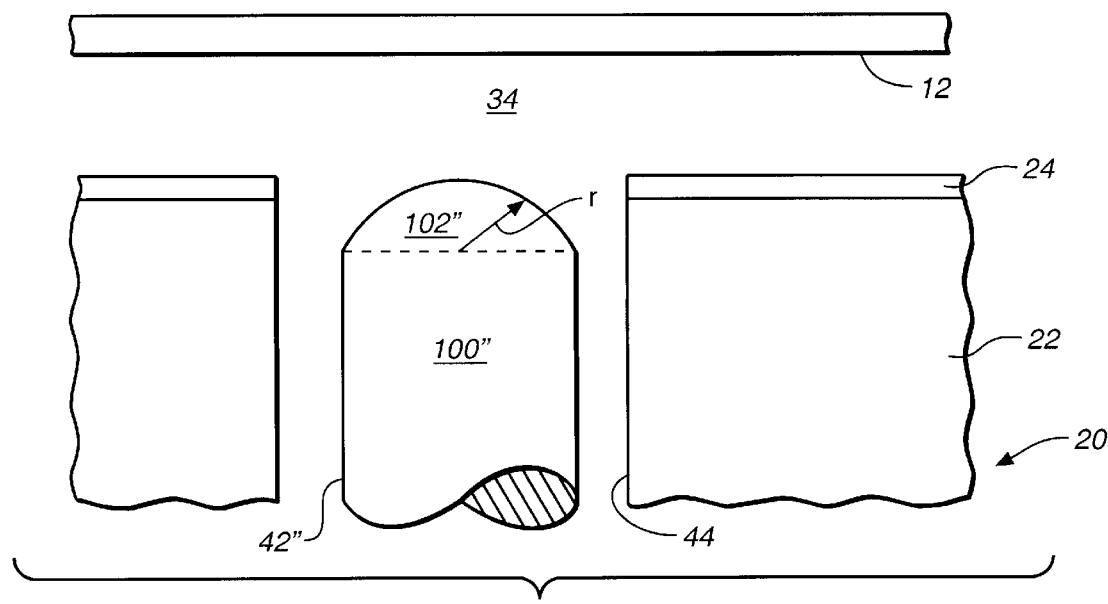
FIG._8B

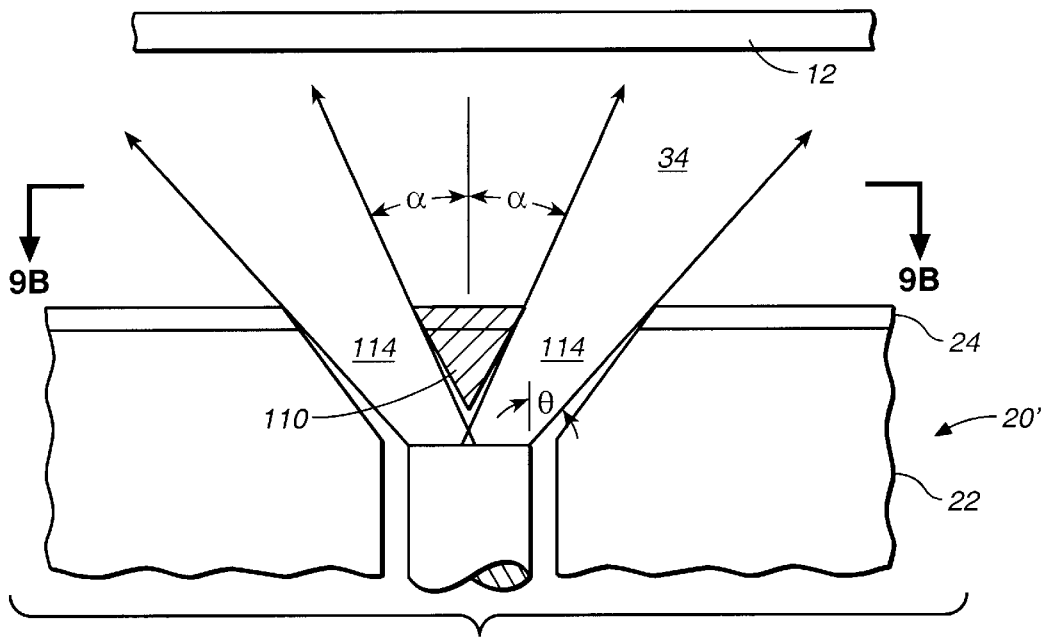
FIG._9A
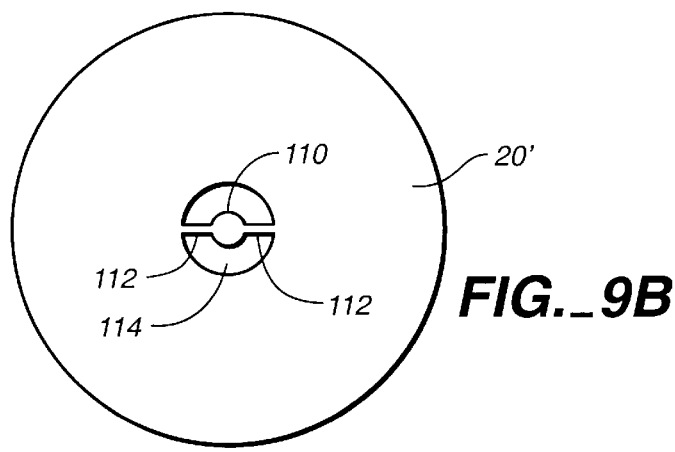
FIG._9B
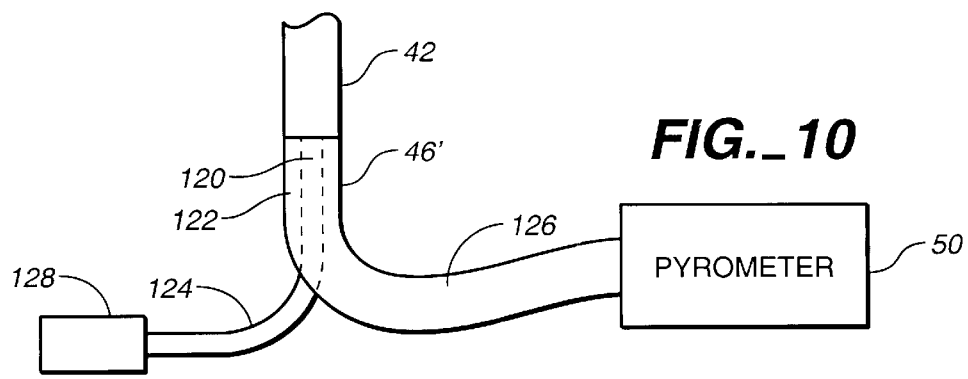
FIG._10

APPARATUS AND METHOD FOR MEASURING SUBSTRATE TEMPERATURE

BACKGROUND OF THE INVENTION

The present invention relates to temperature sensors that are used to measure substrate temperature during thermal processing.

In rapid thermal processing (RTP), a substrate is heated quickly and uniformly to a high temperature, such as 400° Celsius (C) or more, to perform a fabrication step such as annealing, cleaning, chemical vapor deposition, oxidation, or nitration. For example, a thermal processing system, such as the RTP tool available from Applied Materials, Inc., under the trade name "Centura$^R$", may be used to perform metal annealing at temperatures of 400° C. to 500° C., titanium silicide formation at temperatures around 650° C., or oxidation or implant annealing at temperatures around 1000° C.

The temperature of the substrate must be precisely controlled during these thermal processing steps to obtain high yields and process reliability, particularly given the submicron dimension of current semiconductor devices. For example, to fabricate a dielectric layer 60–80 angstroms (Å) thick with a uniformity of +/−2 Å, a typical requirement in current device structures, the temperature in successive processing runs cannot vary by more than a few ° C. from the target temperature. To achieve this level of temperature control, the temperature of the substrate is measured in real time and in situ.

Optical pyrometry is a technology that is used to measure substrate temperatures in RTP systems. Pyrometry exploits a general property of objects, namely, that objects emit radiation with a particular spectral content and intensity that is characteristic of their temperature. Thus, by measuring the emitted radiation, the object's temperature can be determined. A pyrometer measures the emitted radiation intensity and performs the appropriate conversion to obtain the substrate temperature. The relationship between spectral intensity and temperature depends on the spectral emissivity of the substrate and the ideal blackbody intensity-temperature relationship, given by Planck's law:

$$I_b(\lambda, T) = \frac{2C_1}{\lambda^5 \left( e^{\frac{c_2}{\lambda T}} - 1 \right)} \quad (1)$$

where $C_1$ and $C_2$ are known constants, $\lambda$ is the radiation wavelength of interest, and T is the substrate temperature measured in ° K. The spectral emissivity $\epsilon(\lambda,T)$ of an object is the ratio of its emitted spectral intensity $I(\lambda,T)$ to that of a black body at the same temperature $I_B(\lambda,T)$. That is, $$\epsilon(\lambda, T) = \frac{I(\lambda, T)}{I_b(\lambda, T)} \quad (2)$$

Since $C_1$ and $C_2$ are known constants, under ideal conditions, the temperature of the substrate can be accurately determined if $\epsilon(\lambda,T)$ is known.

The emissivity of a substrate depends on many factors, including the characteristics of the wafer itself (e.g., temperature, surface roughness, doping level of various impurities, material composition and thickness of surface layers), the characteristics of the process chamber, and the process history of the wafer. Therefore, a priori estimation of substrate emissivity cannot provide a general purpose pyrometric temperature measurement capability. Consequently, it is necessary to measure the emissivity of the substrate in situ. Unfortunately, it is difficult to accurately measure the emissivity of the substrate. The uncertainty in the measured emissivity introduces an uncertainty into the temperature measurement.

To reduce this uncertainty, several techniques have been developed for reducing the effect of substrate emissivity on the temperature measurement. One such technique involves placing a reflector plate beneath the back surface of a target substrate to form a reflecting cavity. If the reflector plate was an ideal reflector, it can be shown that because all of the radiation emitted from the substrate would be reflected back to the substrate, the reflecting cavity would act as an ideal black body. That is, the intensity of the radiation within the reflecting cavity would not be a function of the emissivity of the surface of the substrate. Thus, in the ideal case, the reflecting cavity increases the effective emissivity of the substrate to a value equal to one.

However, because the reflector plate is not an ideal reflector, the effective emissivity of the substrate will be less than one, although it will be higher than the substrate's actual emissivity. Therefore, the radiation intensity measured by a temperature sensor will still depend upon the emissivity of the substrate. Consequently, although variations in the actual emissivity of the substrate will have less impact on the measured temperature, there will be uncertainty in the temperature measurement.

The thermal processing steps may also cause the reflector plate to become dirty or corroded, and thus less reflective over time. If the reflector plate's reflectivity decreases, the substrate's effective emissivity also decreases. This change in the substrate's effective emissivity changes the intensity of the radiation sampled by the temperature sensor, and can create an error in the measured temperature.

In addition, there are many thermal processing steps which are not compatible with a highly reflective reflector plate. For example, the environment required for a thermal processing step may be corrosive or destructive to such a reflector plate.

In view of the foregoing, there is a need for an improved temperature sensor in which the actual emissivity of the substrate has less effect on the measured temperature.

SUMMARY

In one aspect, the invention is directed to an apparatus for measuring the temperature of a substrate in a thermal processing chamber. The apparatus comprises a reflector located to form a reflecting cavity with a substrate when the substrate is positioned in the chamber, and a temperature sensor including a probe and a detector. The probe has an input end positioned to receive radiation from the reflecting cavity and an output end optically coupled to the detector to provide a temperature reading. The temperature sensor is configured to reduce the effect that radiation which has an axis of propagation within an angle of an axis normal to the reflector has on the temperature reading.

In another aspect, the temperature sensor is configured to reduce the effect that radiation from a portion of the substrate substantially adjacent to the input end of the probe has on the temperature reading.

Implementation of the invention may include the following. The temperature sensor may be configured to reduce the effect that radiation which is substantially normal to the reflector has on the temperature reading, e.g., by not using the radiation within the angle in determining the substrate temperature. The angle may be between about 3 and 10 degrees, e.g., about 5 degrees. The detector may include a photodetector with an array of photodiodes or an annular photodiode, and the radiation within the angle may impinge on a central region of the photodetector. The detector may include circuitry configured to use signals from a portion of the photodiodes which are located in an outer region surrounding the central region of the photodetector in determining the temperature reading, or the central region may be inside an inner diameter of the annular photodiode. An opaque optical element, e.g., reflective or absorptive, may be positioned in an optical path between the input end of the probe and a photodetector in the detector so as to prevent radiation within the angle from impinging on the photodetector. A central region of the optical path may contain a higher proportion of radiation within the angle, and the optical element may be positioned in the central region of the optical path. The optical element may be positioned on a surface of the photodetector, on a filter in the detector, on a lens in the detector, on an optical fiber optically coupling the probe to the detector, or on the output end of the probe. The temperature sensor may be configured so as to prevent radiation within the angle from passing through the probe. For example, the input end of the probe may be configured, e.g., with a conical or spherical tip, so as to prevent radiation within the angle from passing through the probe. A portion of the reflector may extend above the input end of the probe to prevent radiation within the angle from entering the light pipe. A split fiber optic guide may be optically coupled to the output end of the probe, and radiation within the angle enters a central portion of the fiber optic guide. The fiber optic guide may include a first branch with optical fibers from a central portion of the fiber optic guide, and a second branch with optical fibers from an annular portion of the fiber optic guide surrounding the central portion. The second branch may be optically coupled to the detector.

In another aspect, the invention is directed to a thermal processing system. The thermal processing system comprises a processing chamber including a reflector located to form a reflecting cavity with a substrate when the substrate is positioned in the chamber, a probe having an input end positioned to receive radiation from the reflecting cavity and an output end, and a detector optically coupled to the output end of the probe to provide a temperature reading. At least one of the reflector, the probe, and the detector is configured to reduce the effect that radiation with an axis of propagation within an angle of an axis normal to the reflector has on the temperature reading.

In another aspect, the invention is directed to a method of measuring the temperature of a substrate in a thermal processing chamber. In the method, a substrate is positioned in the thermal processing chamber to form a reflecting cavity with a reflector located in the chamber, radiation is sampled from the cavity with a temperature probe, and the sampled radiation is directed along an optical path to a detector to provide a temperature reading. The effect that radiation with an axis of propagation within an angle from an axis normal to the reflector has on the temperature reading is reduced.

Implementations of the invention may include the following. The reducing step may include configuring the detector to ignore at least a portion of the radiation from within the angle which impinges on a photodetector in the detector, positioning a photodetector in the detector to receive a portion of the sampled radiation which contains a lower proportion of radiation from within the angle, preventing radiation within the angle from entering the probe, reflecting at least a portion of the radiation from within the angle, or absorbing at least a portion of the radiation from within the angle.

Advantages of the invention may include the following. The actual emissivity of the substrate has less effect on the temperature measured by the temperature sensor. A partially reflective (e.g., as low as 50% reflectivity) reflector plate may be used to create a virtual black body cavity. This permits the reflector plate to be made from less expensive materials. It also permits the reflector plate to be made of materials which are more compatible with the more destructive or corrosive thermal processes.

Other features and advantages of the invention will be apparent from the following description, including the drawings and the claims.

BRIEF DESCRIPTION OF THE DRAWINGS

FIG. 1 is a schematic cross-sectional view of a rapid thermal processing system.

FIG. 2 is a schematic cross-sectional view of a temperature sensor according to the present invention.

FIG. 3 is a schematic diagram of a virtual black body cavity showing ray-traces of light rays entering the probe of the temperature sensor.

FIG. 4A is a schematic side view of the internal components of a pyrometer box including a photodetector with an array of photodiodes.

FIG. 4B is a view along line 4B—4B of FIG. 4A.

FIG. 5A is a schematic cross-sectional view of a photodetector having inner and outer detector elements.

FIG. 5B is a view along line 5B—5B of FIG. 5A.

FIG. 6A is a schematic cross-sectional view of a photodetector having upper and lower detector elements.

FIG. 6B is a view along line 6B—6B of FIG. 6A.

FIGS. 7A–7E are schematic side views of the light pipe, fiber optic guide, lens, filter and photodetector, respectively, with a reflective element.

FIGS. 8A and 8B are schematic cross-sectional views of a light pipe having a conical and a spherical input end, respectively.

FIG. 9A is a schematic cross-sectional view of a reflector having a light blocking member.

FIG. 9B is a view along line 9B—9B of FIG. 9A.

FIG. 10 is a schematic view of a temperature sensor using a split optical fiber.

DETAILED DESCRIPTION

In the following description, the term "substrate" broadly covers any object that is being processed in a thermal processing chamber and the temperature of which is being measured during processing. The term "substrate" includes, for example, semiconductor wafers, flat panel displays, glass plates or disks, and plastic workpieces.

Referring to FIG. 1, an RTP system 10 includes a processing chamber 12 for processing, for example, an eight inch (200 mm) or twelve inch (300 mm) diameter disk-shaped substrate 14. A description of such an RTP system may be found in U.S. patent application Ser. No. 08/359, 302, filed Dec. 19, 1994, entitled A METHOD AND APPARATUS FOR MEASURING SUBSTRATE TEMPERATURES, now U.S. Pat. No. 5,660,472, assigned to the assignee of the present application, the entire disclosure of which is incorporated herein by reference.

Substrate 14 is rapidly and evenly heated inside chamber 12 to an elevated temperature (e.g., about 1000° C.) and may be subjected to various processing steps such as annealing, cleaning, chemical vapor deposition, etching, oxidation, or nitration. Substrate 14 is supported by a rotating support ring 16 above a reflector 20. The reflector 20 may include an aluminum body 22 coated with a partially or highly reflective layer 24. The reflector 20 is mounted on a base 26. The base may be made of stainless steel. A coolant liquid circulates through passages 28 in base 26 to control the temperature of the base and the reflector.

The reflective layer 24 may be formed from a highly reflective material, such as gold. Gold has a reflectivity of about 0.975 in the infrared wavelength range of interest, i.e., about 900–1000 nm. To further enhance the reflectivity of the reflector, a quarter-wave stack may be formed on the gold layer.

Substrate 14 is heated by a heating element 30 (e.g., a water-cooled array of tungsten-halogen lamps). Radiant energy from heating element 30 passes through a window 32, located directly above the substrate, to quickly and uniformly heat the substrate to an elevated temperature. The heating element and window may be constructed as described in U.S. Pat. No. 5,155,336, the entire disclosure of which is incorporated herein by reference. The underside of substrate 14 and the top of reflector 20 form a reflecting cavity 34 which makes the substrate appear more like an ideal black body. That is, the reflector increases the effective emissivity of the substrate.

A plurality of temperature sensors or pyrometers 40 (e.g., eight, although only three are shown in FIG. 1) are positioned to measure the substrate's temperature at different substrate radii during the processing operation. Each temperature sensor 40 includes a probe to sample radiation from the cavity, and a detector apparatus to measure the intensity of the sampled radiation and convert the measured intensity into a temperature measurement. As will be described in greater detail below, each temperature sensor 40 is designed to reduce the collection of direct radiation emitted by the substrate and increase the collection of reflected radiation. Specifically, each temperature sensor 40 is designed to substantially exclude or ignore radiation entering the probe from angles which are nearly normal to the reflector.

Referring to FIG. 2, the probe may be a light pipe 42 which extends through a conduit 44 from the backside of base 26 and into an aperture in reflector 20. The light pipe may be a sapphire or quartz tube about 0.05 to 0.125 inches in diameter. One end of light pipe 42 is located near (e.g., flush with) the top of reflector 20 to sample radiation from reflecting cavity 34. The other end of the light pipe is optically coupled to (e.g., held in close contact with) a flexible fiber optic guide 46. Fiber optic guide 46 and light pipe 42 may be coupled by a threaded connector 48.

Sampled radiation passes down light pipe 42, through fiber optic guide 46, and into a detector apparatus, such as a pyrometer box 50 (e.g., a Luxtron AccuFiber Model 100, available from Luxtron Corporation of Santa Clara, Calif.). The pyrometer box computes the temperature of substrate 14 from the intensity of the radiation sampled by light pipe 42. The pyrometer box 50 may have a narrow bandwidth, e.g., about 40 nanometers (nm), located at about 950 nm.

Inside pyrometer box 50, radiation from fiber optic guide 46 passes through a collimating lens 52 to form a light beam 53. The light beam 53 passes through an optical pyrometer filter 54 before impinging a photodetector 56 (e.g., a photodiode). The signal from photodetector 56 is input to control electronics 58 which convert that signal to a temperature reading. The temperature reading from control electronics 58 may be used by a controller (not shown) to dynamically control the power to heating element 30 to correct for any deviations from a predefined temperature cycle.

Referring to FIG. 3, reflector 20 is positioned beneath substrate 14 to create the virtual blackbody reflecting cavity 34. In general, the radiation entering light pipe 42 is made up of many components, including components emitted directly from the substrate and reflected components. For example, the radiation indicated by ray R includes one component emitted directly from the substrate (from point A) and has experienced no reflections; a second component (from point B and reflected at point A) has experienced only one reflection off of reflector 20 and the backside of substrate 12; a third component (from point C and reflected at points A and B) has experienced two reflections off of reflector 20 and the backside of substrate 12; etc. Thus, the total intensity $I_T$ of radiation sampled by light pipe 42 can be found by summing over an infinite series of components of impinging radiation as follows:

$$I_T = \epsilon \cdot \sigma \cdot T^4 \cdot \sum_n R^n \cdot (1-\epsilon)^n \qquad (3)$$

which reduces to $$I_T = \frac{\epsilon \cdot \sigma \cdot T^4}{1 - R(1-\epsilon)} \qquad (4)$$

where R is the reflectivity of the reflector, $\epsilon$ is the emissivity of the substrate, $\sigma$ is the Stefan-Boltzman constant, and T is the temperature of the substrate. Assuming that the reflectivity of the reflector is equal to one (R=1), Equation 4 reduces to:

$$I_T = \sigma T^4 \qquad (5)$$

in which the radiation intensity $I_T$ is independent of emissivity of the backside of the substrate. Thus, in an ideal system, the sampled radiation intensity $I_T$ could be converted by the pyrometer box into a measured temperature by using Equation 5.

Unfortunately, the presence of each light pipe 42 introduces a localized disturbance in the virtual blackbody effect in reflector cavity 34. The size of the disturbance tends to increase with increasing size (D) of the aperture in the reflector which accomodates the light pipe. This disturbance counteracts the emissivity-enhancing effect produced by the reflector. Thus, this localized disturbance in the virtual blackbody cavity reduces the effective emissivity of substrate 12 in a region directly above the light pipe. In contrast, the effective emissivity of the remainder of the substrate remains substantially unaffected by the disturbance.

Without being limited to any particular theory, one possible cause of the disturbance is that the light pipe aperture acts as an energy sink. The effect may be explained by assuming that the substrate is perfectly specular and considering the radiation entering the light pipe at a specific point (e.g., point P). The portion of this radiation which enters the light pipe within an angle $\phi$ consists entirely of radiation emitted directly by the substrate (e.g., from point A'). This portion does not contain any reflected components. This is because radiation which would otherwise constitute one of the reflected components (e.g., radiation from point B') will enter light pipe 42 rather than be reflected off reflector 20. Since the radiation within the angle $\phi$ consists entirely of radiation emitted directly from the substrate, without any reflections, there is no emissivity-enhancing effect in the region of the substrate directly above the light pipe. In short, the probe itself creates an area where radiation is not reflected, thus lowering the effective emissivity of the substrate. Although the localized disturbance is most easily explained for a specular substrate, the effect also occurs in diffuse substrates.

Since the lowered effective emissivity occurs directly over the light pipe, the effective emissivity of the substrate may be increased by collecting less radiation from the region of the substrate directly above light pipe 42. By either preventing the radiation within a central angle α (typically measured as an angle between the axis of propagation of the radiation and an axis normal to reflector) from entering the detector apparatus or by not processing this radiation, the temperature sensor uses more reflected radiation. Thus, the substrate has a higher effective emissivity to temperature sensor 40 due to the virtual blackbody cavity effect. The central angle α may be about the same as the angle φ. The central angle α may be between about 3° and 10°, e.g., it may be approximately 5°. Assuming the central angle α is fairly small, e.g., less than 10°, this radiation may be considered to be substantially normal to the reflector surface.

Referring to FIG. 4A, as previously discussed, the radiation transmitted by fiber optic guide 46 passes through lens 52 before reaching photodetector 56. Because the fiber optic guide and light pipe operate by total internal reflection, the distribution of input angles at the input end of the light pipe is preserved at its output end. Therefore, the radiation which entered light pipe 42 within angle α will exit fiber optic guide 46 within the same angle α. This radiation is collimated by lens 52 to form a central portion 60 of beam 53. The radiation entering light pipe 42 at an angle between an acceptance angle θ (defined by the numerical aperture of lens 52) and the central angle α forms an outer portion 64 of beam 53. The central portion 60 of beam 53 strikes a central area 62 of photodetector 56, whereas outer portion 64 of beam 53 strikes an outer area 66 of the photodetector.

In one implementation, photodetector 56 is a charged coupled device (CCD) or a similar multi-element detector. Referring to FIG. 4B, photodetector 56 will include some detector elements 68a, such as photodiodes, associated with central area 62 and some detector elements 68b, possibly also photodiodes, associated with outer area 66. Control electronics 58 may be configured (e.g., by software control) to ignore the output signals of detector elements 68a when calculating the total intensity measured by photodetector 56. Thus, in effect, temperature sensor 40 only uses radiation from outside the central angle α in computing the substrate temperature. Therefore, less direct radiation and more reflected radiation is used to make this computation. As a result, the effective emissivity of the substrate is increased.

Due to the increased effective emissivity of the substrate in the embodiment of FIGS. 4A–4B, and in the embodiments described below, a partially reflective reflector may be used in place of the highly reflective material described above. For example, the reflectivity of reflector 20 in the wavelength range of interest may be in the range of 0.5 to 0.95. This permits other materials, such as nickel, aluminum or rhodium, to be used for reflective layer 24. In fact, reflective layer 24 may be eliminated entirely so that the body 22 acts as the reflector. This reduces the cost of reflector 20 and permits the RTP system to be used in a wider variety of fabrication processes.

Referring to FIGS. 5A and 5B, in another embodiment, photodetector 56' is formed from a single central inner detector 70 and an annular outer detector 72. The central portion 60 of beam 53 strikes inner detector 70, whereas outer portion 64 of the beam strikes outer detector 72. The control electronics may be connected only to outer detector 72, or the control electronics may be connected to both detectors 70 and 72 but be configured to exclude the signals generated by inner detector 70.

Referring to FIGS. 6A and 6B, in yet another embodiment, photodetector 56" may be formed from an upper detector 80 having an aperture 82 and a lower detector 84. The outer portion 64 of beam 53 impinges upper detector 80, whereas central portion 60 of the light beam passes through aperture 82 and strikes lower detector 84. The control electronics may be connected only to upper detector 80, or the control electronics may be connected to both detectors 80 and 84 and be configured to exclude the signals generated by lower detector 84 from the total radiation intensity measurement.

Referring to FIGS. 7A–7E, in another embodiment, an absorptive or reflective optical element 90 may be placed in the optical path of the radiation traveling from light pipe 42 to photodetector 56 so as to absorb or reflect light rays within the central angle α. Preferably, optical element 90 is a reflective multi-layer film formed on one of the optical components of temperature sensor 40. The optical element 90 may be placed on the output end of light pipe 42 (see FIG. 7A), at the end of fiber optic guide 46 (see FIG. 7B), on either side of lens 52 (see FIG. 7C), on either side of filter 54 (see FIG. 7D), or directly on photodetector 56 (see FIG. 7E). The optical element could be deposited directly on the optical component, or it could be attached with an adhesive. Multiple absorptive or reflective elements may be placed in several of the above-mentioned locations. Since the opaque elements block the radiation from within angle α, the effective emissivity of the substrate is increased.

Referring to FIG. 8A, in another embodiment, light pipe 42' may have cylindrical body 100' and a conical input end 102'. The conical angle γ of input end 102' is selected so that radiation entering the light pipe from within the central angle α (i.e., light ray 104) is refracted and exits the light pipe, as shown. In contrast, radiation entering the light pipe from outside the central angle α (e.g., light ray 106) passes down the light pipe to the detector apparatus. Since light from within the central angle α does not reach the pyrometer box, the effective emissivity of the substrate is increased.

Referring to FIG. 8B, light pipe 42" may have a cylindrical body 100" and a hemispherical input end 102". Some of the nearly normal radiation entering the light pipe will be refracted and exit the light pipe. Light pipe 42" is somewhat less effective than light pipe 42', but is easier to manufacture.

Referring to FIGS. 9A and 9B, in a further embodiment, reflector 20' is configured to physically block the substantially normal radiation emitted from substrate 12 in the region directly above the light pipe. The reflector 20' includes a conical block 110 with a reflective upper surface suspended over light pipe 42 by one or more support struts or rib members 112. The open space between conical block 110 and the remainder of reflective plate 20 forms an aperture 114. Radiation from regions of the substrate which are not directly above the light pipe will pass through aperture 114 to enter the light pipe. However, radiation from above light pipe 42 within angle α is prevented from entering light pipe 42, and thus the effective emissivity of the substrate is increased.

Referring to FIG. 10, in another embodiment, fiber optic guide 46' may be a split fiber optic bundle with a first branch 124 and a second branch 126. The portion of fiber optic guide 46' adjacent to the end of light pipe 42 includes a central portion 120 and an outer portion 122. The first branch 124 includes the optical fibers from central portion 120 and second branch 126 includes the optical fibers from outer portion 122. The second branch 126 is directed to detector apparatus 50, whereas first branch 124 is directed to a reflector or another detector 128. Therefore, radiation within angle α will enter the first branch, whereas radiation outside angle α will enter the second branch. As a result, radiation within angle α does not reach the detector, and the effective emissivity of the substrate is increased.

The invention is not limited to the embodiments depicted and described. Rather, the scope of the invention is defined by the appended claims.

What is claimed is:

1. An apparatus for measuring a temperature of a substrate in a thermal processing chamber, comprising:
    a reflector located to form a reflecting cavity with a substrate when the substrate is positioned in the chamber; and
    a temperature sensor including a probe and a detector, the probe having an input end positioned to receive radiation from the reflecting cavity and an output end optically coupled to the detector to provide a temperature reading, wherein the temperature sensor is configured to reduce the effect on the temperature reading of radiation along an axis of propagation within an angle of an axis normal to the reflector.

2. The apparatus of claim 1, wherein the axis of propagation is substantially normal to the reflector.

3. The apparatus of claim 1, wherein the angle is between about 3 and 10 degrees.

4. The apparatus of claim 2, wherein the angle is about 5 degrees.

5. The apparatus of claim 1, wherein the temperature sensor does not use radiation within the angle in determining the substrate temperature.

6. The apparatus of claim 1, wherein the detector is a photodetector having an array of photodiodes arranged in a central region and an outer region, the outer region surrounding the central region, radiation within the angle impinging on the central region of the photodetector, and wherein the detector uses signals only from the photodiodes in the outer region in determining the temperature reading.

7. The apparatus of claim 1, wherein the detector is an annular photodiode, and radiation within the angle is directed to a region inside an inner diameter of the annular photodiode.

8. The apparatus of claim 1, wherein the detector is a photodetector and an opaque optical element is positioned in an optical path between the input end of the probe and the photodetector so as to prevent radiation within the angle from impinging on the photodetector.

9. The apparatus of claim 8, wherein the optical path includes a central region containing a higher proportion of radiation within the angle, and the optical element is positioned in the central region of the optical path.

10. The apparatus of claim 9, wherein the optical element is reflective.

11. The apparatus of claim 8, wherein the optical element is absorptive.

12. The apparatus of claim 8, wherein the optical element is positioned on a surface of the photodetector.

13. The apparatus of claim 8, wherein a filter is in the optical path, and the optical element is positioned on the filter.

14. The apparatus of claim 8, wherein a lens is in the optical path, and the optical element is positioned on the lens.

15. The apparatus of claim 8, wherein an optical fiber optically couples the probe to the photodetector, and the optical element is positioned on an end of the optical fiber.

16. The apparatus of claim 8, wherein the optical element is positioned at the output end of the probe.

17. The apparatus of claim 1, wherein the probe is configured so as to prevent radiation within the angle from exiting through the output end of the probe.

18. The apparatus of claim 1, wherein the input end of the probe is configured so as to prevent radiation within the angle from exiting the output end of the probe.

19. The apparatus of claim 18, wherein the input end of the probe includes a conical tip shaped portion so that radiation within the angle is refracted and exits the input end of the probe.

20. The apparatus of claim 18, wherein the input end of the probe includes a spherical tip portion so that radiation within the angle is refracted and exits the input end of the probe.

21. The apparatus of claim 1, wherein a portion of the reflector extends over the input end of the probe to prevent radiation within the angle from entering the probe.

22. The apparatus of claim 1, wherein the temperature sensor includes a split fiber optic guide optically coupled to the output end of the probe, and radiation within the angle enters a central portion of the fiber optic guide, the fiber optic guide including a first branch and a second branch, the second branch being optically coupled to the detector and radiation within the central portion of the fiber optic guide passing through the first branch.

23. A thermal processing system, comprising:
    a processing chamber including a reflector located to form a reflecting cavity with a substrate when the substrate is positioned in the chamber;
    a probe having an input end and an output end, the input end positioned to receive radiation from the reflecting cavity; and
    a detector optically coupled to the output end of the probe to provide a temperature reading, wherein at least one of the reflector, the probe, and the detector is configured to reduce the effect on the temperature reading of radiation propagating within an angle of an axis normal to the reflector.

24. A method of measuring a temperature of a substrate in a thermal processing chamber, comprising:
    positioning a substrate in the thermal processing chamber to form a reflecting cavity with a reflector located in the chamber;
    sampling radiation from the cavity with a temperature probe;
    directing the sampled radiation along an optical path to a detector to provide a temperature reading; and
    reducing the effect that radiation along an axis of propagation within a central angle from an axis normal to the reflector has on the temperature reading.

25. The method of claim 24, wherein the reducing step includes configuring the detector so that radiation within the central angle impinges on a selected portion of the detector so as not to be used in determining the substrate temperature.

26. The method of claim 24, wherein the reducing step includes preventing radiation within the central angle from entering the probe.

27. The method of claim 24, wherein the reducing step includes preventing at least a portion of the radiation within the central angle from exiting an output end of the probe.

28. The method of claim 24, wherein the reducing step includes at least one of absorbing and reflecting along the optical path, at least a portion of the radiation within the central angle.

29. An apparatus for measuring a temperature of a substrate in a thermal processing chamber, comprising:
- a reflector located to form a reflecting cavity with a substrate when the substrate is positioned in the chamber;
- a probe having an input end positioned to receive radiation from the reflecting cavity; and
- a detector optically coupled to an output end of the probe to provide a temperature reading, wherein the detector is configured to substantially exclude from the temperature measurement radiation propagated along a path within an angle from an axis normal to the reflector.

30. An apparatus for measuring a temperature of a substrate in a thermal processing chamber, comprising:
- a reflector located to form a reflecting cavity with a substrate when the substrate is positioned in the chamber;
- a probe having an input end positioned to receive radiation from the reflecting cavity;
- a detector optically coupled to an output end of the probe to provide a temperature reading; and
- an element positioned in an optical path from the probe to the detector to at least one of block and reflect radiation along an axis of propagation within an angle of an axis normal to the reflector.

31. An apparatus for measuring a temperature of a substrate in a thermal processing chamber, comprising:
- a reflector located to form a reflecting cavity with a substrate when the substrate is positioned in the chamber;
- a probe having an input end positioned to receive radiation from the reflecting cavity, the input end configured to prevent radiation along an axis of propagation within an angle of an axis normal to the reflector from exiting through an output end of the probe; and
- a detector optically coupled to the output end of the probe to provide a temperature reading.

32. An apparatus for measuring a temperature of a substrate in a thermal processing chamber, comprising:
- a reflector located to form a reflecting cavity with a substrate when the substrate is positioned in the chamber;
- a probe having an input end positioned to receive radiation from the reflecting cavity, wherein a portion of the reflector extends over the input end to prevent radiation along an axis of propagation within an angle of an axis normal to the reflector from entering the probe; and
- a detector optically coupled to an output end of the probe to provide a temperature reading.

33. An apparatus for measuring a temperature of a substrate in a thermal processing chamber, comprising:
- a reflector located to form a reflecting cavity with a substrate when the substrate is positioned in the chamber;
- a probe having an input end positioned to receive radiation from the reflecting cavity;
- a split fiber optic guide optically coupled to an output end of the probe, the fiber optic guide having a first branch and a second branch, wherein radiation along an axis of propagation within an angle of an axis normal to the reflector is directed into the first branch; and
- a detector optically coupled to the second branch to provide a temperature reading.

34. An apparatus for measuring the temperature of a substrate in a thermal processing chamber, comprising:
- a reflector located to form a reflecting cavity with a substrate when the substrate is positioned in the chamber; and
- a temperature sensor including a probe and a detector, the probe having an input end positioned to receive radiation from the reflecting cavity and an output end optically coupled to the detector to provide a temperature reading, wherein the temperature sensor is configured to reduce the effect that radiation from a portion of the substrate substantially adjacent to the input end of the probe has on the temperature reading.

35. A temperature sensor for measuring a temperature of a substrate in a thermal processing chamber, the chamber including a reflector forming a reflecting cavity with a substrate when the substrate is positioned in the chamber, the temperature sensor comprising;
- a probe having an input end and an output end, the input end of the probe being positioned to receive radiation from the reflecting cavity;
- a detector optically coupled to the output end of the probe; and
- wherein at least one of the probe and the detector is configured to improve the accuracy of the temperature measurement by reducing the effect that radiation not reflected by the reflector would otherwise have thereon.

36. The temperature sensor of claim 35, wherein the angle is between about 0 and 10 degrees.

37. The temperature sensor of claim 36, wherein the angle is between about 3 and 10 degrees.

* * * * *